United States Patent [19]

Iwasaki et al.

[11] Patent Number: 4,966,385
[45] Date of Patent: Oct. 30, 1990

[54] DOUBLE WISHBONE TYPE SUSPENSION

[75] Inventors: Takashi Iwasaki, Susono; Hiroshi Shimomura, Suzono, both of Japan

[73] Assignee: Toyota Jidosha Kabushiki Kaisha, Toyota, Japan

[21] Appl. No.: 337,553

[22] Filed: Apr. 13, 1989

[30] Foreign Application Priority Data

Apr. 13, 1988 [JP] Japan .................. 63-88913

[51] Int. Cl.⁵ .............................. B60G 3/20
[52] U.S. Cl. .................... 280/698; 280/690
[58] Field of Search ............ 280/698, 701, 663, 664, 280/688, 690, 691, 673, 668

[56] References Cited

FOREIGN PATENT DOCUMENTS 28-4365   9/1953  Japan .
56-82613  7/1981  Japan .................. 280/690
56-128207 10/1981 Japan .
57-209408 12/1982 Japan .
58-47613  3/1983  Japan .
61-182307 11/1986 Japan .

Primary Examiner—David M. Mitchell
Assistant Examiner—Karin Tyson
Attorney, Agent, or Firm—Oblon, Spivak, McClelland, Maier & Neustadt

[57] ABSTRACT

A double wishbone type suspension includes a wheel carrier, a lower control arm having one end swingably connected to the wheel carrier and the other end swingably connected to a vehicle body, a shock absorber having a shell and a piston rod projecting from the shell and disposed with the shell being above and the piston rod being below the shell and an upper control arm having one end swingably connected to the wheel carrier. The shell of the shock absorber is connected to the vehicle through an elastic mount and the piston rod is swingably connected to the lower control arm. The other end of the upper control arm is swingably connected to the shell.

8 Claims, 6 Drawing Sheets

DOUBLE WISHBONE TYPE SUSPENSION

BACKGROUND OF THE INVENTION

1. Field of the Invention:

This invention relates to a double wishbone type suspension for the use of a vehicle.

DESCRIPTION OF THE PRIOR ART

In a so-called double wishbone type suspension for supporting a wheel carrier with upper and lower control arms arranged to be vertically spaced apart from each other, an inner end of the upper control arm is supported by a structure generally divided into three kinds.

In a first support structure, the inner end of the upper control arm is pivotally connected directly to a vehicle body or a sub-frame (which will be hereinafter referred to as vehicle body).

In a second support structure, the inner end of the upper control arm is first pivotally connected to a bracket and the upper control arm is then connected to the vehicle body through the bracket (Japanese Utility Model Public Disclosure (KOKAI) No. 61-182307 and Japanese Pat. Publication (Tokyo Koho) No. 28-4365).

In a third support structure, the inner end of the upper control arm is pivotally connected to a shell of a shock absorber installed to attenuate vibrations applied to the wheel carrier, the shock absorber being disposed in a normal condition that a piston rod projecting from the shell is located above the shell (Japanese Pat. Public Disclosures (KOKAI) No. 58-47613, No. 57-209408 and No. 56-128207).

According to the first support structure, since the upper control arm is connected directly to the vehicle body, the structure on the vehicle body side is complicated and the rigidity of the vehicle body is partially reduced.

According to the second support structure, the reduction of rigidity of the vehicle body may be restrained by properly selecting the rigidity and configuration of the bracket. On the other hand, since the bracket is rigidly connected to the vehicle body, vibrations from the upper control arm are transmitted to the vehicle body, so that there is a possibility of damaging the riding comfort. In order to avoid the damage of riding comfort, it is necessary to interpose a rubber insulator and the like between the bracket and the vehicle body to thereby bring about the increment of the number of parts and the complication of the structure.

According to the third support structure, the defects in the first and second support structures may be eliminated. However, in this support structure, since the connection of the upper control arm to the shell is vertically moved along with bound and rebound and the upper control arm is hardly swung, it is difficult to substantially change a camber angle of a tire attached to the wheel carrier at the time of occurrence of the bound and rebound. As a result, the camber relative to the ground at the time of occurrence of the bound may be excessively positive to thereby exert a bad influence upon the turning performance.

SUMMARY OF THE INVENTION

An object of the present invention is to provide a double wishbone type suspension which is simple in the whole structure and may largely change the camber.

A double wishbone type suspension according to the present invention comprises a wheel carrier, a lower control arm having one end swingably connected to the wheel carrier and the other end swingably connected to a vehicle body, a shock absorber having a shell and a piston rod projecting from the shell, one of the shell and piston rod being connected to the vehicle body through an elastic mount, the other of the shell and piston rod being swingably connected to one of the wheel carrier and lower control arm and an upper control arm having one end swingably connected to the wheel carrier and the other end swingably connected to either one of the shell and piston rod of the shock absorber which is connected to the vehicle body.

In a preferred embodiment, the shock absorber is disposed to be turned upside down, that is, the shell is disposed above while the piston rod is disposed below. The shell is connected to the vehicle body through the elastic mount, while it is swingably connected to the upper control arm, and the piston rod is swingably connected to the lower control arm.

For example, when the tire is under the bound condition, the piston rod of the shock absorber is contracted relative to the shell, while the connection of the upper control arm to the shock absorber is hardly vertically moved. Therefore, the upper control arm comes to swing relatively largely. As a result, the position of the wheel carrier is largely changed to change a camber angle.

Since only one end of the shock absorber and the lower control arm are connected with the vehicle body, the whole structure of the suspension is simplified.

By positively changing the camber angle, the turning performance may be improved.

Since the vibrations applied from the wheel carrier to the upper control arm are attenuated by the elastic mount, the vibrations transmitted to the vehicle body may be reduced.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF PREFERRED EMBODIMENTS

Figure 1:
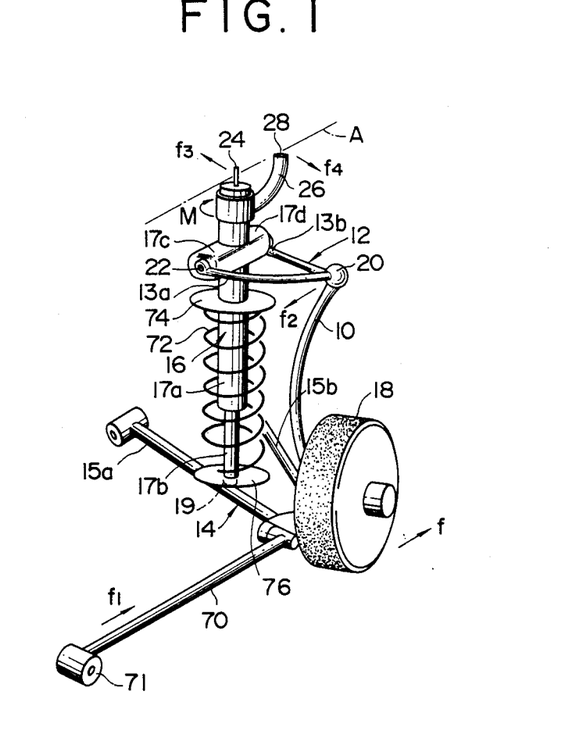
FIG. 1 is a perspective view showing a double wishbone type suspension.

As shown in FIG. 1, a double wishbone type suspension comprises a wheel carrier 10, an upper control arm 12, a lower control arm 14 and a shock absorber 16.

The wheel carrier 10 has a structure, well known per se, and rotatably supports a tire 18.

The upper control arm 12 is connected through a ball joint 20 to an upper portion of the wheel carrier 10. The upper control arm 12 in this embodiment is formed so as to be bifurcated inwardly from the connection of the arm 12 to the wheel carrier 10, and two inner ends 13a,13b thereof are pivotally connected to the shock absorber 16 through a horizontal shaft 22 as will be later described.

The two inner ends of the upper control arm 12 are preferably provided so as to be located in front and rear of a center axis of the shock absorber 16, that is, to be symmetrical about an imaginary plane including the center axis of the shock absorber 16 and the center of the ball joint 20. Thus, the shock absorber 16 may be isolated from the action of a rotary moment caused by lateral force applied to the tire 18.

In the embodiment shown, the lower control arm 14 has a front link 15a and a rear link 15b. The front link 15a is disposed in the lateral direction of a vehicle body. The front link 15a has an outer end connected to a lower portion of the wheel carrier 10 through a rubber bushing and an inner end connected to the vehicle body through a rubber bushing, the outer and inner ends being swingable about respective horizontal axes. The link 15a is pivotally connected to the shock absorber 16 as will be later described. Also, the rear link 15b is disposed obliquely to the lateral direction of the vehicle body. The rear link 15b has an outer end connected to the lower portion of the wheel carrier 10 through a rubber bushing and an inner end connected to the vehicle body through a rubber bushing, the outer and inner ends of the rear link being swingable about the respective horizontal axes. Since the connecting structure is well known per se, the illustration thereof will be omitted.

The shock absorber 16, well known per se, has a shell 17a, a piston (not shown) disposed to be movable in the shell and a piston rod 17b connected to the piston and projecting from the shell 17a to the outside.

In the embodiment shown, the shock absorber 16 is disposed to be turned upside down with the shell 17a being above and the piston rod 17b being below. The shell 17a is provided with a forwardly extending boss 17c and a rearwardly extending boss 17d. The inner ends 13a,13b of the upper control arm 12 are respectively brought into contact with the bosses 17c,17d, and a shaft 22 loosely inserted into each of the ends is press fitted in each boss, so that the upper control arm 12 is connected to the shell 17a so as to be swingable about a horizontal axis. Also, the piston rod 17b is connected to the lower control arm 14 through a bushing 19 so as to be swingable about a horizontal axis.

The shock absorber 16 is mounted through a support on the vehicle body and supported so as to be swingable about a horizontal axis without rotating due to a rotary moment based on longitudinal force applied to the wheel carrier 10.

Figure 2:
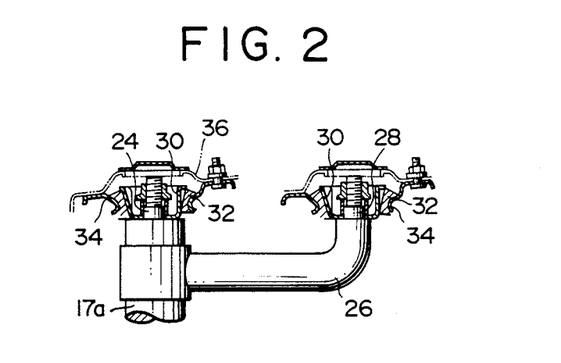
FIG. 2 is a side view showing a support for mounting a shock absorber on a vehicle body.

In the embodiment shown in FIGS. 1 and 2, a pin 24 projects vertically from the shell 17a of the shock absorber 16. On the other hand, an L-shaped support member 26 is rigidly connected to the shell 17a and a pin 28 projects vertically from a rear end of the support member 26. A line A interconnecting the axes of the pins 24,28 is located in the longitudinal direction of the vehicle body. Each of the pins 24,28 is mounted on a vehicle body 36 through a bracket 30, a rubber cushion 32 bonded to the bracket 30 and a bracket 34 bonded to the cushion 32.

Figure 3:
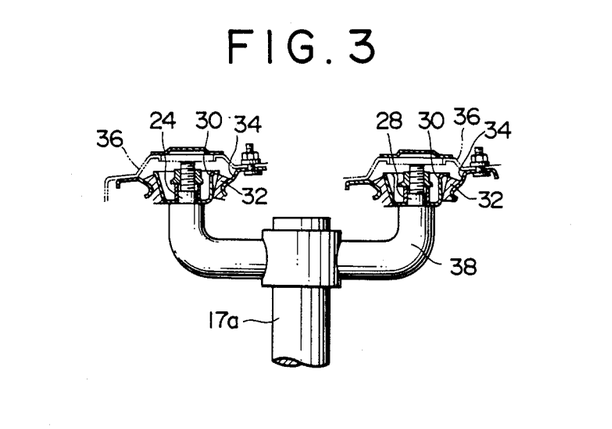
FIGS. 3 and 4 are side views showing another embodiment of the support, respectively.

In the embodiment shown in FIG. 3, an U-shaped support member 38 is rigidly connected to the shell 17a of the shock absorber and pins 24,28 project vertically from front and rear ends of the support member 38, respectively. Both pins are located in front and rear of the vehicle body to be mounted on the vehicle body 36 with the similar structure shown in FIG. 2.

Figure 4:
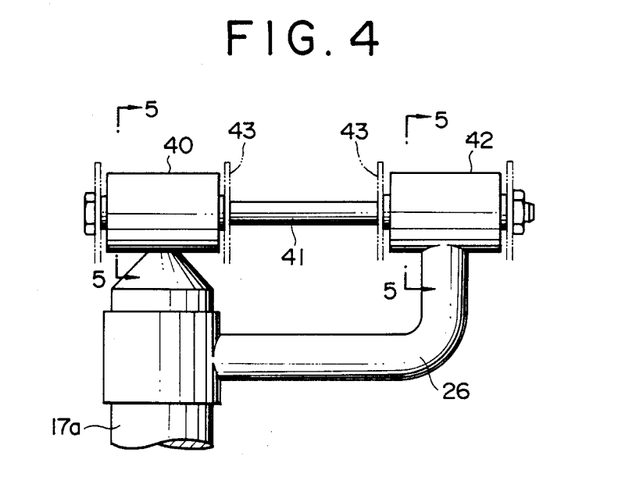

In the embodiment shown in FIG. 4, an eye 40 having a horizontal axis is rigidly connected to the shell 17a of the shock absorber. On the other hand, an L-shaped support member 26 is rigidly connected to the shell 17a and an eye 42 having a horizontal axis is rigidly connected to the support member 26. Respective horizontal axes of the eyes 40, 42 are located in the longitudinal direction of the vehicle body and are pivotally connected to brackets 43 of the vehicle body through a common shaft 41.

Figure 5:
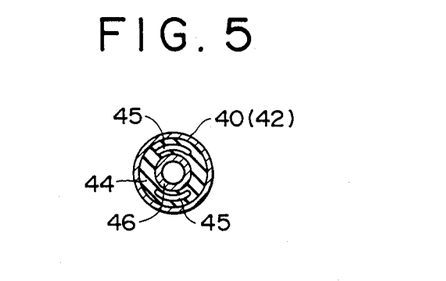
FIG. 5 is a sectional view taken along the line 5—5 in FIG. 4.

As shown in FIG. 5, a rubber bushing 44 is bonded to each of the eyes and a sleeve 46 is bonded to the bushing 44. Upper and lower portions of the bushing 44 sandwiching the sleeve 46 are provided with a pair of slots 45. As will be later described, when the wheel carrier 10 connected to a strut bar is used, the wheel carrier 10 is restrained by the strut bar at the time of bound to swing in the longitudinal direction. However, the provision of the slots in the bushing 44 may cope with this longitudinal swing of the wheel carrier.

Figure 6:
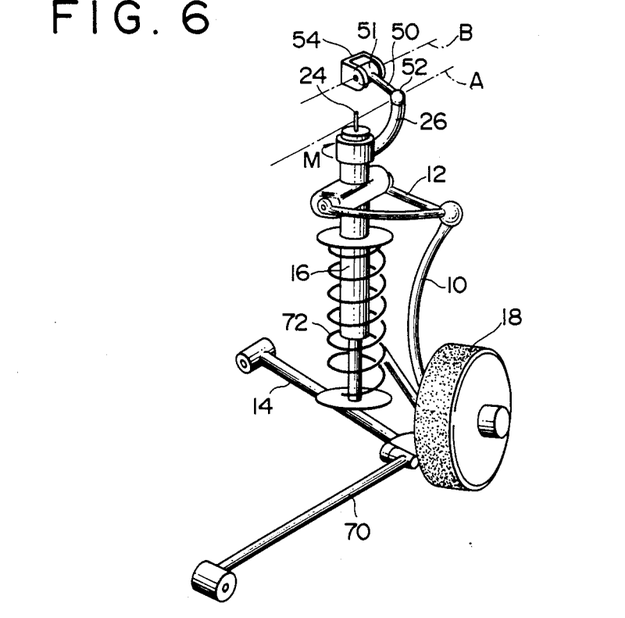
FIGS. 6 and 7 are perspective views showing another embodiments of the double wishbone type suspension, respectively.

Since the embodiment shown in FIG. 6 is the same as that in FIG. 1 in the basic structure of the double wishbone type suspension, the detailed description thereof will be omitted by designating the same parts with the same symbols.

In this embodiment, an outer end of an auxiliary rod 50 is connected through a ball joint 52 to the rear end of the support member 26 which is rigidly connected to the shock absorber 16, and an inner end of the auxiliary rod 50 is provided with an eye 51. An axis B of the eye 51 extends in parallel to a line A interconnecting an axis of the front pin 24 and the center of the ball joint 52. The eye 51 is pivotally connected to a bracket 54 of the vehicle body through a rubber bushing (not shown). The bushing disposed in the eye 51 will do without any slot.

Figure 7:
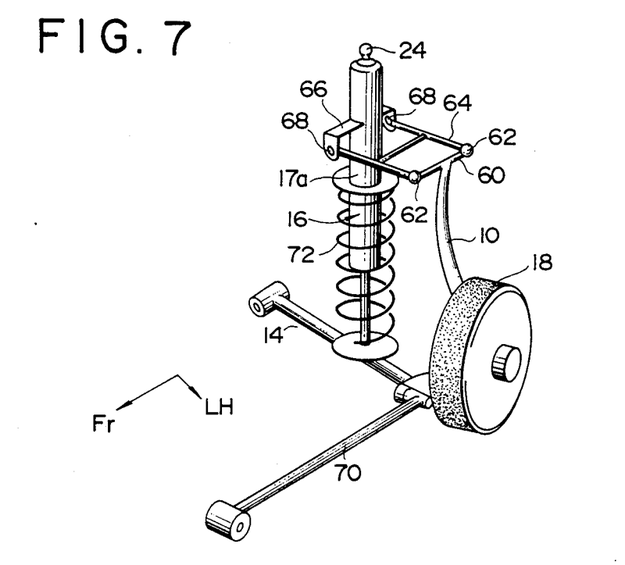

The shock absorber 16 may be also configured as shown in FIG. 7 in order to be supported swingably about the horizontal axis without rotating by the rotary moment based on the longitudinal force applied to the wheel carrier 10.

In this embodiment, a rod 60 having a longitudinal axis is rigidly connected to the upper end of the wheel carrier 10, and front and rear ends of the rod 60 are connected through corresponding ball joints 62 to outer ends of a rigid member 64 having a H-shaped configuration in a plane view. Inner ends of the rigid member 64 are connected through corresponding front and rear ball joints 68 to a bracket 66 which is rigidly connected to the shell 17a of the shock absorber 16. A line interconnecting both centers of the front and rear ball joints 68 extends in parallel to the axis of the rod 60. The shock absorber 16 is mounted through the bracket, cushion and the like on the vehicle body by the pin 24.

A strut bar 70 is disposed in the longitudinal direction of the vehicle body and has one end connected to the wheel carrier 10 and the other end connected to the vehicle body through a bushing 71.

A coil spring 72 is disposed between a spring carrier 74 mounted on the shell 17a of the shock absorber 16 below the bosses 17c, 17d and a spring carrier 76 mounted on the piston rod 17b.

Further, in the above embodiment, the shock absorber 16 is disposed to be turned upside down so that the upper control arm 12 is connected to the shell 17a and the lower control arm 14 is connected to the piston rod 17b. By so doing, the upper control arm 12 may be connected to any desired portion of the shell 17a and the lower control arm 14 may be connected to the lower end of the piston rod 17b to thereby facilitate the manufacture thereof.

Figure 11:
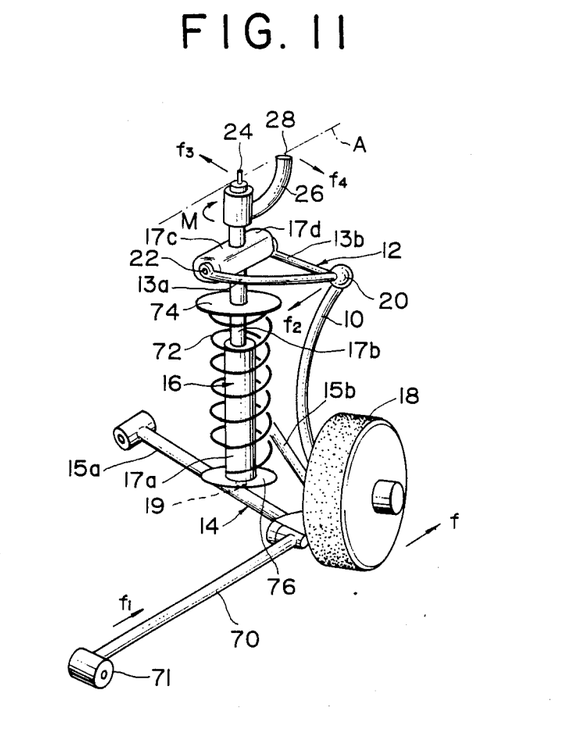
FIG. 11 is a perspective view showing a further embodiment of the double wishbone type suspension.

As shown in FIG. 11, the shock absorber 16 may be disposed in a normal condition with the shell 17a being below and the piston rod 17b being above to thereby connect the upper and lower control arms 12,14 respectively to the piston rod and shell. In this case, the spring carrier 74 and the spring carrier 76 are mounted respectively on the piston rod 17b and the shell 17a, and the bosses 17c, 17d are provided on the piston rod 17b above the spring carrier 74. Two ends 13b, 13c of the upper arm 12 are connected to the respective bosses 17c, 17d. Other configurations of the embodiment shown in FIG. 11 are similar with those of the embodiment shown in FIG. 1.

Figure 8:
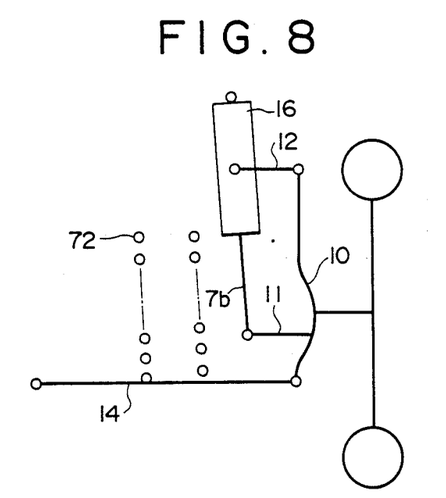
FIG. 8 is a schematic view showing a further embodiment of the double wishbone type suspension.

Also, in the above embodiment, the piston rod 17b of the shock absorber 16 is connected to the lower control arm 14. Instead, as shown in FIG. 8, a support portion 11 may project inwardly from the wheel carrier 10 to connect the end of the piston rod 17b to the support portion 11. In this embodiment, the coil spring 72 is disposed between the lower control arm 14 and the vehicle body.

When the tire 18 bounds in travelling, the piston rod 17b of the shock absorber 16 is contracted relative to the shell 17a, while the pivotal point of the upper control arm 12 about the shell 17a is hardly shifted upwardly and the upper control arm 14 swings relatively largely, so that the position of the wheel carrier 10 is changed to vary the camber angle of the tire 18.

Figure 9:
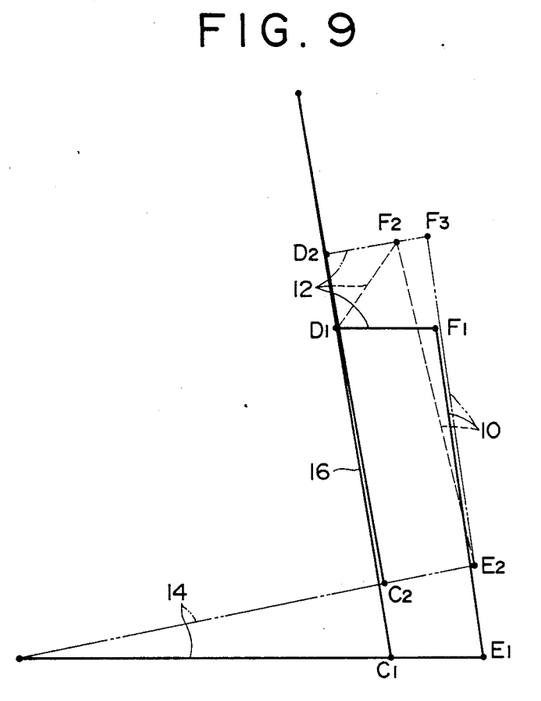
FIG. 9 is a schematic view showing how the camber is altered with bound.

Assuming that respective parts of the suspension are located under the standard condition as shown by the solid line in FIG. 9, the lower control arm 14 is located by the bound in the position indicated by the chain line. Then, the pivotal point of the lower control arm 14 about the piston rod of the shock absorber 16 is shifted from $C_1$ to $C_2$ while the pivotal point of the lower control arm 14 about the wheel carrier 10 is shifted from $E_1$ to $E_2$. However, the pivotal point of the upper control arm 12 about the shell is substantially in the same position $D_1$ as that before the bound. As a result, the upper control arm 12 swings relatively greatly as shown by the broken line and the pivotal point of the upper control arm 12 about the wheel carrier 10 is shifted to $F_2$, so that the position of the wheel carrier 10 is largely changed as shown by the broken line.

On the other hand, in the third prior support structure in which the shock absorber is disposed in a normal condition and the inner end of the upper control arm 12 is pivotally connected to the shell, when the lower control arm 14 reaches a position indicated by the imaginary line due to the bound and the pivotal point of the lower control arm 14 about the shock absorber 16 is shifted from $C_1$ to $C_2$, the pivotal point of the upper control arm 12 about the shell is shifted upwardly to $D_2$. As a result, the upper control arm 12 hardly swings as shown by the imaginary line. Then, the pivotal point of the upper control arm 12 about the wheel carrier 10 is shifted to $F_3$. Therefore, the position of the wheel carrier 10 hardly varies from the position of the wheel carrier before the bound as shown by the imaginary line.

The following effects may be obtained in accordance with the above embodiments.

When braking force f is applied to a grounding point of the tire 18 in travelling, as shown in FIG. 1, backward force $f_1$ and forward force $f_2$ are generated respectively in the mounting portion of the strut bar 70 on the vehicle body and the connection 20 of the upper arm 12 to the wheel carrier 10. Moment M tending to rotate the shock absorber 16 around its axis acts on the shock absorber 16 by the force $f_2$ generated in the connection 20.

When the moment M is generated, laterally inward force $f_3$ and outward force $f_4$ are respectively generated in the pin 24 of the shock absorber 16 and the pin 28 of the support member 26. The forces $f_3, f_4$ are received respectively by the support constituted from the bracket 30, bushing 32 and the like. The forces $f_3, f_4$ are not exerted in the torsional direction of the support, but exerted in the direction orthogonal to the longitudinal axis A to provide high rigidity against the moment M tending to rotate the shock absorber 16. Thus, the shock absorber 16 is prevented from being rotated about the axis.

When the suspension of the above embodiments is compared with a Macpherson strut type suspension, there is a case in the present suspension that it is possible to lessen the lateral force which is generated in a seal portion provided in a portion of the shock absorber where the piston rod projects from the shell. Thus, the frictional resistance is reduced to thereby improve the riding comfort.

Figure 10A:
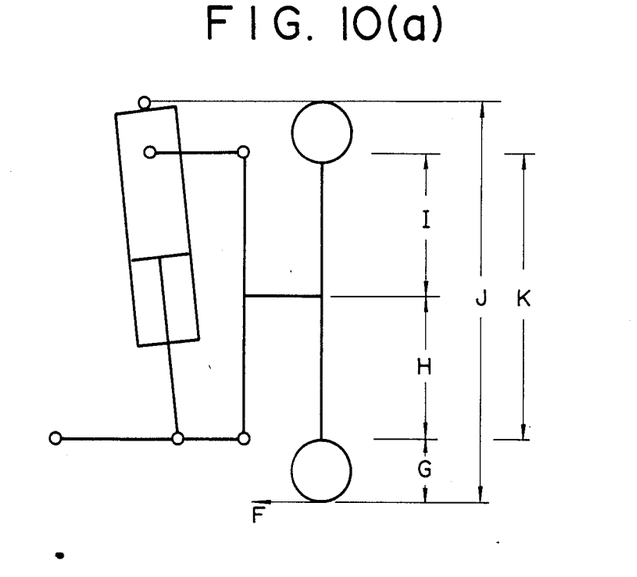
FIGS. 10a and 10b are schematic views for considering effects due to lateral force.
Figure 10B:
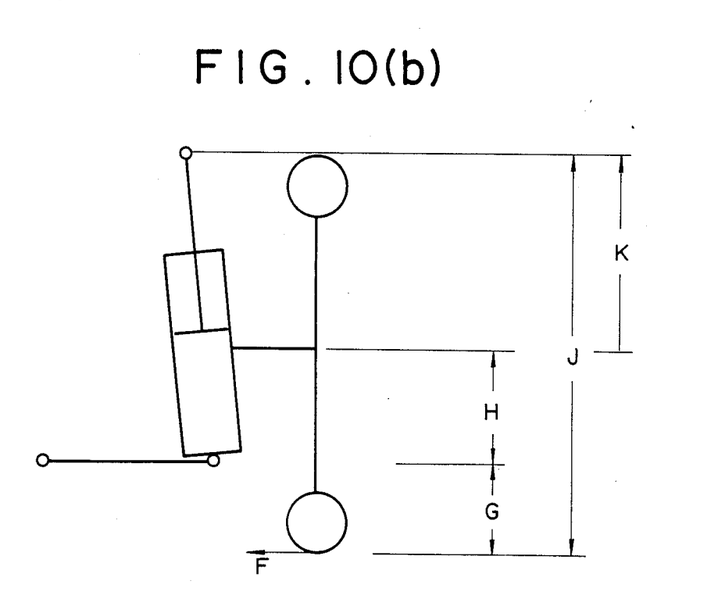

As shown in FIG. 10, in the suspension (a) according to the present invention and the Macpherson strut type suspension (b), the seal portions are considered to be located within the range shown by K. When each dimension as shown in FIG. 10 is taken, within the range K, shearing force applied to the shock absorber comes to $$\left( \frac{G}{H+I} - \frac{G}{J-G} \right) \times F$$

according to the present invention while it comes $$\frac{G}{J-G} \times F$$

according to the Macpherson strut type suspension. Accordingly, considering the difference between both shearing forces, if $J-(G+H+I) \leqq (H+I)$, the lateral force applied to the seal portion in the shock absorber of the suspension according to the present invention comes to be smaller than that applied to the seal portion in the shock absorber of the Macpherson strut type suspension.

What is claimed is:

1. A double wishbone type suspension comprising:
   a wheel carrier;
   a lower control arm having one end swingably connected to the wheel carrier and the other end swingably connected to a vehicle body;
   a shock absorber having a shell and a piston rod projecting from the shell, one of the shell and piston rod being connected to the vehicle body through a support having an elastic cushion and the other of said shell and piston rod being swingably connected to one of said wheel carrier and lower control arm; and
   an upper control arm having one end swingably connected to said wheel carrier and the other end swingably connected to either one of said shell and piston rod of said shock absorber, the one being connected to the vehicle body and moved relatively to the other of said shell and piston rod connected to the lower arm when a tire supported by the wheel carrier bounds.

2. A double wishbone type suspension as claimed in claim 1, wherein the upper control arm is formed of a rigid member having generally H-shaped configuration in a plane view, thereby preventing rotation due to a rotary moment based on longitudinal force applied to the wheel carrier.

3. A double wishbone type suspension as claimed in claim 1, wherein said support is supported so as to be swingable about a horizontal axis without rotating due to a rotary moment based on longitudinal force applied to the wheel carrier.

4. A double wishbone type suspension as claimed in claim 3, wherein the upper control arm is formed so as to be bifurcated inwardly from the connection to the wheel carrier.

5. A double wishbone type suspension as claimed in claim 4, wherein two inner ends of the upper control arm are provided so as to be symmetrical about an imaginary plane including a center axis of the shock absorber and a center of a ball joint which is located at the connection of the wheel carrier to the upper control arm.

6. A double wishbone type suspension as claimed in claim 3, wherein the support has two connecting portions spaced apart from each other longitudinally of the vehicle body, each connecting portion being provided with a rubber cushion.

7. A double wishbone type suspension as claimed in claim 1 or 3, wherein the shock absorber is disposed with the shell being above and the piston rod being below the shell.

8. A double wishbone type suspension comprising:
   a wheel carrier;
   a lower control arm having one end swingably connected to the wheel carrier and the other end swingably connected to a vehicle body;
   a shock absorber having a shell and a piston rod projecting from the shell and disposed with the shell being above and the piston rod being below the shell, the shell being connected through a support on the vehicle body and supported so as to be swingable about a horizontal axis without rotating due to a rotary moment based on longitudinal force applied to the wheel carrier, the piston rod being swingably connected to the lower control arm; and
   an upper control arm formed so as to be bifurcated inwardly from the connection to the wheel carrier, connected to the wheel carrier through a ball joint and connected by two ends thereof swingably to the shell of the shock absorber.

* * * * *